United States Patent
Berkland et al.

(12)

(10) Patent No.: US 6,223,185 B1
(45) Date of Patent: Apr. 24, 2001

(54) METHOD FOR DEFINING COMPOSED OBJECT METHODS AND ATTRIBUTES BY DYNAMICALLY PRESENTING COMPOSITE VALUES AND OPTIONS

(75) Inventors: Philip Theodore Berkland, Austin, TX (US); Howard Justin Glaser; David Joseph Kuettel, both of San Jose, CA (US); Stewart Earle Nickolas, Round Rock; John Conrad Sanchez, Pflugerville, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/127,467

(22) Filed: Jul. 31, 1998

(51) Int. Cl.[7] .................................................. G06F 17/30
(52) U.S. Cl. .............................................................. 707/103
(58) Field of Search .................................. 707/103, 102; 709/303, 315; 345/433, 435, 340, 341, 342, 343, 347

(56) References Cited

U.S. PATENT DOCUMENTS

| 5,414,806 | * | 5/1995 | Richards ............................... 345/435 |
| 5,640,546 | * | 6/1997 | Gopinath et al. ..................... 713/400 |
| 6,088,739 | * | 7/2000 | Pugh et al. ............................ 709/315 |

FOREIGN PATENT DOCUMENTS

| 0 733 970 | 9/1996 | (EP) ................................. G06F/9/46 |

OTHER PUBLICATIONS

Ossher et al., "Subject–oriented composition rules" Oopsla 95, pp. 235–250, Oct. 1995.*

Kung et al., "Object–oriented real time systems modeling and verification" Proceedings: Third International workshop on object–oriented real time dependable systems, pp. 224–231, Oct. 1995.*

Kentaro Shimizu et al., "Hierarchical Object Groups in Distributed Operating Systems", Proceedings of the International Conferecne on Distributed Computing Systems, U.S., Washington, IEEE Comp. Soc. Press, 1998, pp. 18–24.

* cited by examiner

Primary Examiner—Hosain T. Alam
Assistant Examiner—Sanjiv Shah
(74) Attorney, Agent, or Firm—Gates & Cooper

(57) ABSTRACT

A method, apparatus, and article of manufacture for combining existing objects is disclosed. The method comprises the steps of accepting a selection of existing objects to combine, retrieving the methods and attributes of the selected objects, applying a composition rule to the retrieved methods and attributes to define combined methods and attributes, and storing references to the combined methods and attributes to the composite object. The present invention also comprises an article of manufacture, tangibly embodying a series of instructions for performing the above steps. The apparatus comprises a processor for selecting existing objects and for applying a composition rule to the retrieved objects and methods and an I/O device for retrieving the methods an attributes for the selected objects and for storing references to the combined methods and attributes.

39 Claims, 11 Drawing Sheets

METHOD FOR DEFINING COMPOSED OBJECT METHODS AND ATTRIBUTES BY DYNAMICALLY PRESENTING COMPOSITE VALUES AND OPTIONS

CROSS-REFERENCE TO RELATED APPLICATIONS

This application is related to the following co-pending and commonly-assigned application, which application is hereby incorporated by reference herein:

Application Ser. No. 09/127,473, filed on same date herewith now pending, by Philip T. Berkland, Howard J. Glaser, and Stewart E. Nickolas, entitled "Dynamic Expression Editor".

BACKGROUND OF THE INVENTION

1. Field of the Invention

The present invention relates to systems and methods of object-oriented programming, and in particular to a method and system for creating composite objects from existing objects.

2. Description of the Related Art

Object oriented programming has become increasingly popular among software developers, because it offers the benefits of increased application portability, interoperability, and interchangeability. Object-oriented programming techniques also reduce development risk and software development costs, and can extend the life cycle of the final product to prevent premature obsolescence.

An industry-consensus standard interface definition for interoperable software, known as the Common Object Request Broker Architecture (COBRA) has been defined. COBRA simplifies the development and deployment of distributed systems software in several ways. First, COBRA defines a distributed environment using an object-oriented paradigm that hides differences between programming languages, operating systems, and object locations. Second, COBRA's object oriented approach allows diverse types of implementations to inter-operate at the same level, hiding idiosyncrasies and supporting reuse.

A central component of COBRA is an Object Request Broker (ORB), which functions as a communications infrastructure, transparently transceiving object requests across distributed heterogeneous computing environments. This is accomplished through a well-defined interface called the Interface Definition Language (IDL). Further details regarding COBRA are set forth in "The Essential Cobra, Systems Integration Using Distributed Objects," by Thomas W. Mobray and Ron Zahavi, 1995, which publication is hereby incorporated by reference herein.

Toolkits are available to support the COBRA programming model and allow users to use visual tools to generate applications by creating new objects, edit existing objects, generate dynamic link libraries (DLLs), and package applications so they can be published to a server.

However, although existing tools allow new objects to be defined and edited, these tools do not allow the user to create composite objects by combining user-selectable elements of existing objects under user-definable rules. What is needed is a system and method which allow the user to create new objects by combining elements of existing objects and which provides a simple and intuitive interface for doing so. The present invention satisfies that need.

SUMMARY OF THE INVENTION

To address the requirements described above, the present invention discloses a method, apparatus, and article of manufacture for combining existing objects.

The method comprises the steps of accepting a selection of existing objects to combine, retrieving the methods and attributes of the selected objects, applying a composition rule to the retrieved methods and attributes to define combined methods and attributes, and storing references to the combined methods and attributes to the composite object. The present invention also comprises an article of manufacture, tangibly embodying a series of instructions for performing the above steps.

The apparatus comprises a processor for selecting existing objects and for applying a composition rule to the retrieved objects and methods and an I/O device for retrieving the methods and attributes for the selected objects and for storing references to the combined methods and attributes.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
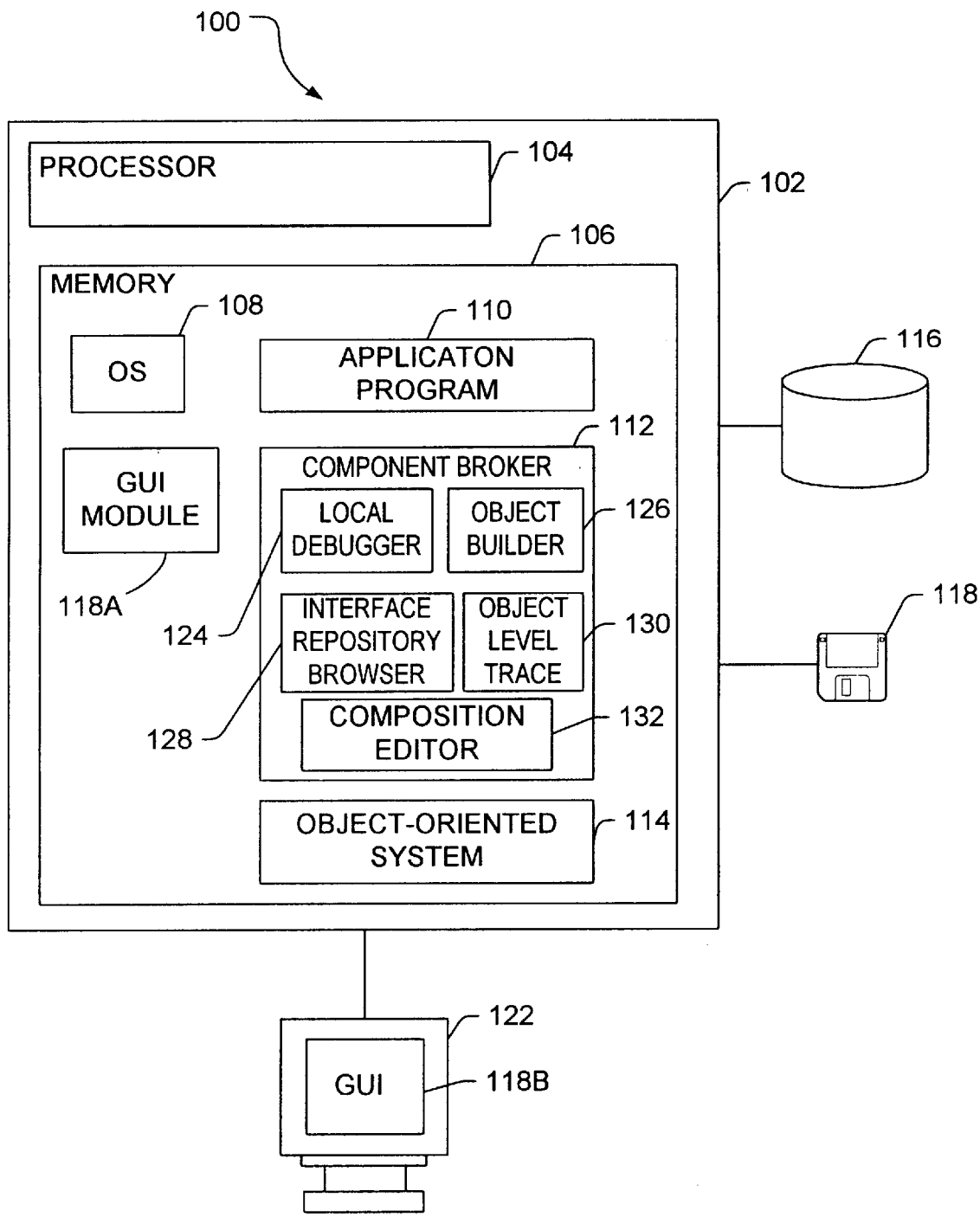
FIG. 1 is a block diagram illustrating a computer environment that may be used to practice the present invention.

FIG. 1 illustrates an exemplary computer system 100 that could be used to implement the present invention. The computer 102 comprises a processor 104 and a memory (RAM) 106. The computer 102 is operatively coupled to a display 122, which presents images such as windows to the user on a graphical user interface 118B. The computer 102 may be coupled to other devices, such as a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the application program 110, or implemented with special purpose memory and processors. The computer 102 implements a component broker 112 which comprises a suite of tools which allows an application program 110 to be created from an object oriented system 114. After completion, the application 110 accesses and manipulates an object-oriented system 114 stored in the memory 106 of the computer 102 using the relationships and logic that was generated using the component broker 112.

In one embodiment, the operating system 108, the computer program 110, the component broker 112, and the object-oriented system 114 are tangibly embodied in a computer-readable medium, e.g., data storage device 116, which could include one or more fixed or removable data storage devices, such as a zip drive, floppy disc drive 120, hard drive, CD-ROM drive, tape drive, etc. Further, the operating system 108, the computer program 110, and the component broker 112 are all comprised of instructions which, when read and executed by the computer 102, causes the computer 102 to perform the steps necessary to implement and/or use the present invention. Of course, those skilled in the art will recognize many modifications may be made to this configuration without departing from the scope of the present invention.

The Component Broker

The component broker 112 provides a suite of tools that allows the user to write applications in an object oriented programming context. These tools include an object builder 126, a local debugger 124, an object level trace 130, an interface repository browser 128, and a composition editor 132.

The local debugger 124 and object level trace (OLT) 130 are used to perform interactive, modular testing and debugging of applications.

The interface repository browser 128 can configure on-line help, view object definitions and relationships among definitions, as well as search and modify objects in the repository.

The object builder 126 is used to generate applications for visual tools for C++ and Java by creating and working with components. A component is a distributed set of objects that client applications can be accessed as a single entity, and which work together to represent the logic and data relationships that perform a desired function for the user. Although components generally comprise a plurality of objects, each with a set of methods and attributes, the component is presented to the client application as a single class, with set of methods and attributes like any other class. However, although the objects are presented in a single interface, each component can include multiple objects on both a client and a server.

Managed Objects

Figure 2:
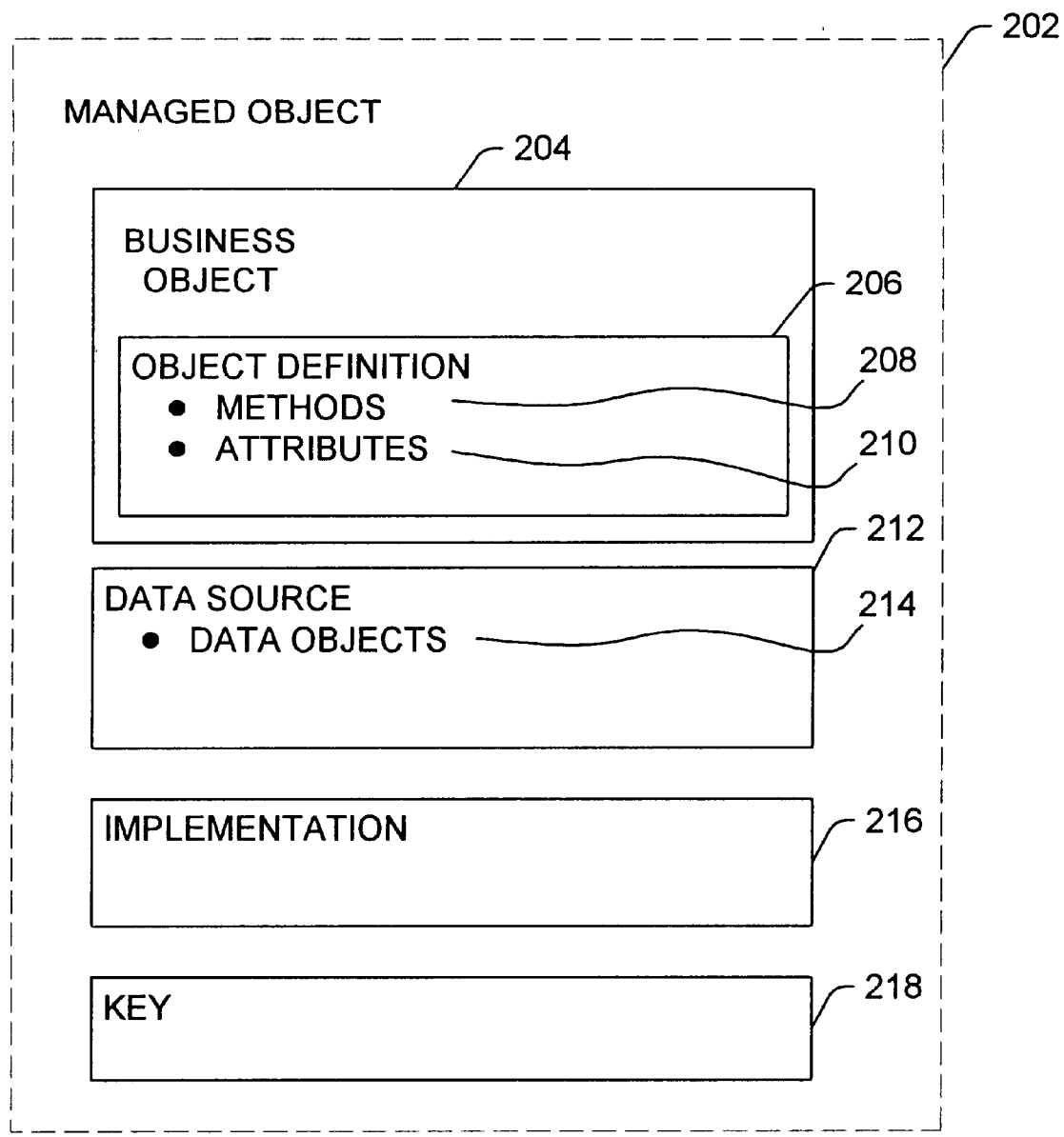
FIG. 2 is a diagram showing the contents of a managed object.

FIG. 2 is a diagram showing the contents of a managed object 202. Managed objects (MOs) 202 are a class of object that represents the component to the client application, and handles all calls from the client to the component on the computer 100 or server. Managed objects 202 handle communication with other classes, initialization, de-initialization, activation, and passivation of the business objects 204 included within the managed object 202. Managed objects 202 also define the set of methods that are implemented by the business object to work with the appropriate application. An application is defined by adding and configuring MOs 202.

A managed object 202 comprises a business object 204, a data source 212, an implementation 216, and a key 218. Business objects 204 includes one or more methods 208, and one or more attributes 210. Methods 208 include code that implements the functions and define the behavior of the business object 204. Attributes 210 includes variable definitions which define the states of the business object 204.

Business objects 204 are independent of any individual application and can be used in any combination to perform a desired task. Typical examples of business objects are: Customer, Invoice, or Account. A business object 204 may also have relationships with other business objects 204 and can cooperate with these other business objects to perform a desired task.

Business objects 204 do not have direct access to data. Instead, access to data is provided via a data source 212 including a data object 204. Data objects 214 are responsible for managing the persistence of a component's state data, and provide an interface for accessing state data. By providing an interface between business objects 204 and the data, the data object 214 isolates the business object 204 and relieves it from having to keep track of how to access and manage the data while maintaining persistency. Data objects 214 include a data object interface, which defines the state data of the component, and the data object implementation, which defines the form of persistence, and access patters for the data. Dummy data objects 214 are created when a business object 204 is created.

The managed object also comprises a key 218, which defines which attributes are to be used to find a particular instance of a component in a server. The key 218 consists of one or more of the business object 204 and attributes 210. Because COBRA does not permit passing a mix of different data types in a single call, the key 218 is defined as a separate class. This allows multiple attributes and data types to be mixed in any combination and allows the key to be changed, allowing more than one key for different situations, without affecting the remainder of the component. The implementation module 216 defines additional methods and implementing code.

Process

Figure 3:
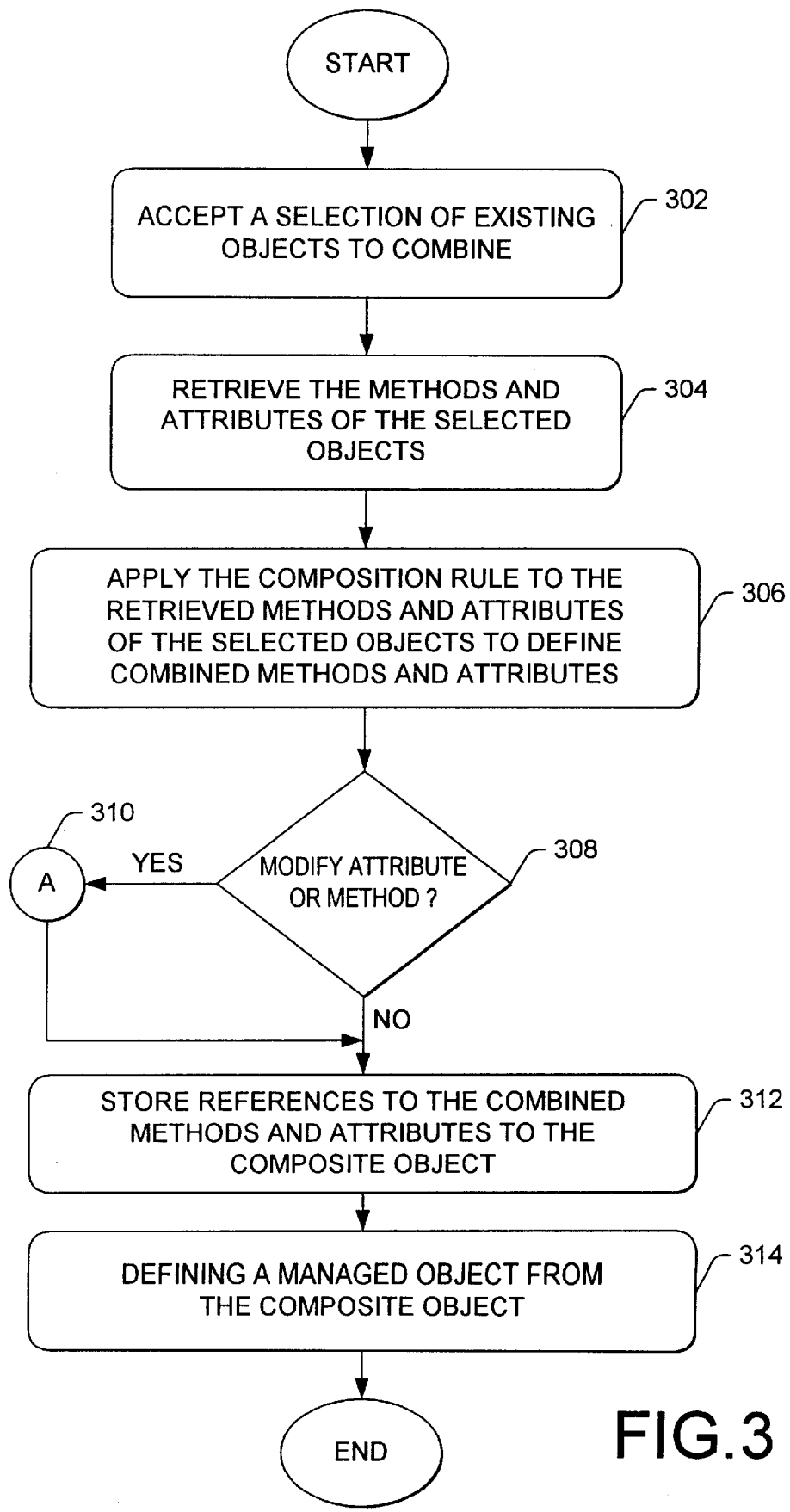
FIG. 3 is a flow chart showing the operations used to practice one embodiment of the present invention.

FIG. 3 is a flow chart showing the operations used to practice one embodiment of the present invention. The process begins by accepting a selection of existing objects to combine, as shown in block 302. Next, the method and attributes of the selected objects are retrieved, as shown in block 304. A composition rule is then applied 306 to the retrieved methods and attributes for the selected objects to define methods and attributes for the combined object.

The present invention permits modification of the combined object's attributes or method. If this feature is selected, block 308 directs the logical flow to block 310. If no methods or attributes of the combined object are to be modified, logical flow proceeds to block 312, where references to the combined methods and attributes are stored to the composite object. This effectively implements a "deep copy" of the appropriate methods and attributes, in that all pointers and other functional connectors between the attributes, methods, and other object elements are maintained.

The foregoing steps create a composite business object from the selection of existing objects. To create a composite managed object, other elements, namely the key and the data object must be defined for the composite business object. This is depicted in block 314.

Figure 4:
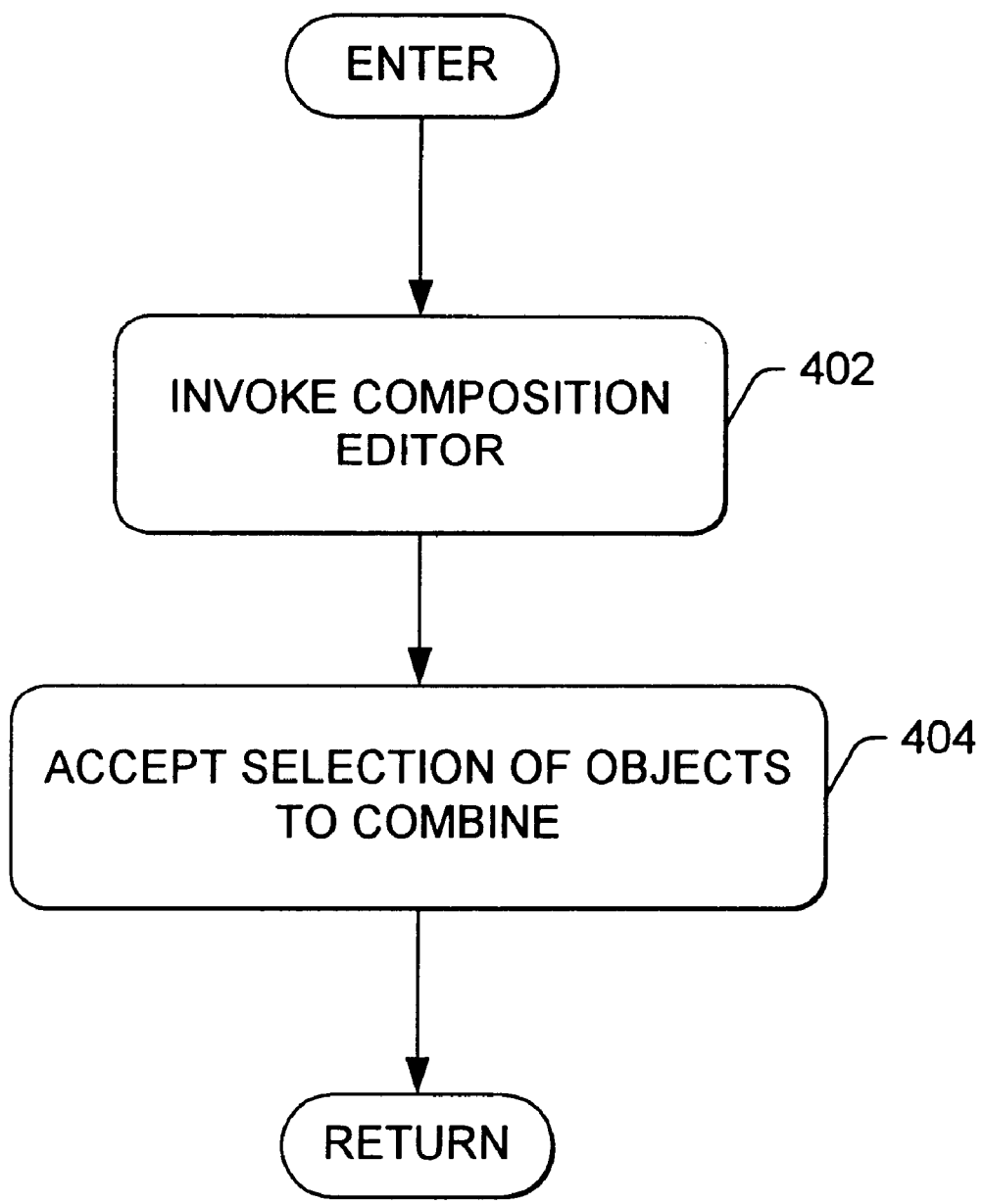
FIG. 4 is a flow chart depicting the operations used to accept a selection of existing objects.

FIG. 4 is a flow chart depicting the operations used to accept a selection of the existing objects to combine. A composition editor 132 is invoked, and a selection of objects to combine is selected, as shown in blocks 402 and 404.

Figure 5:
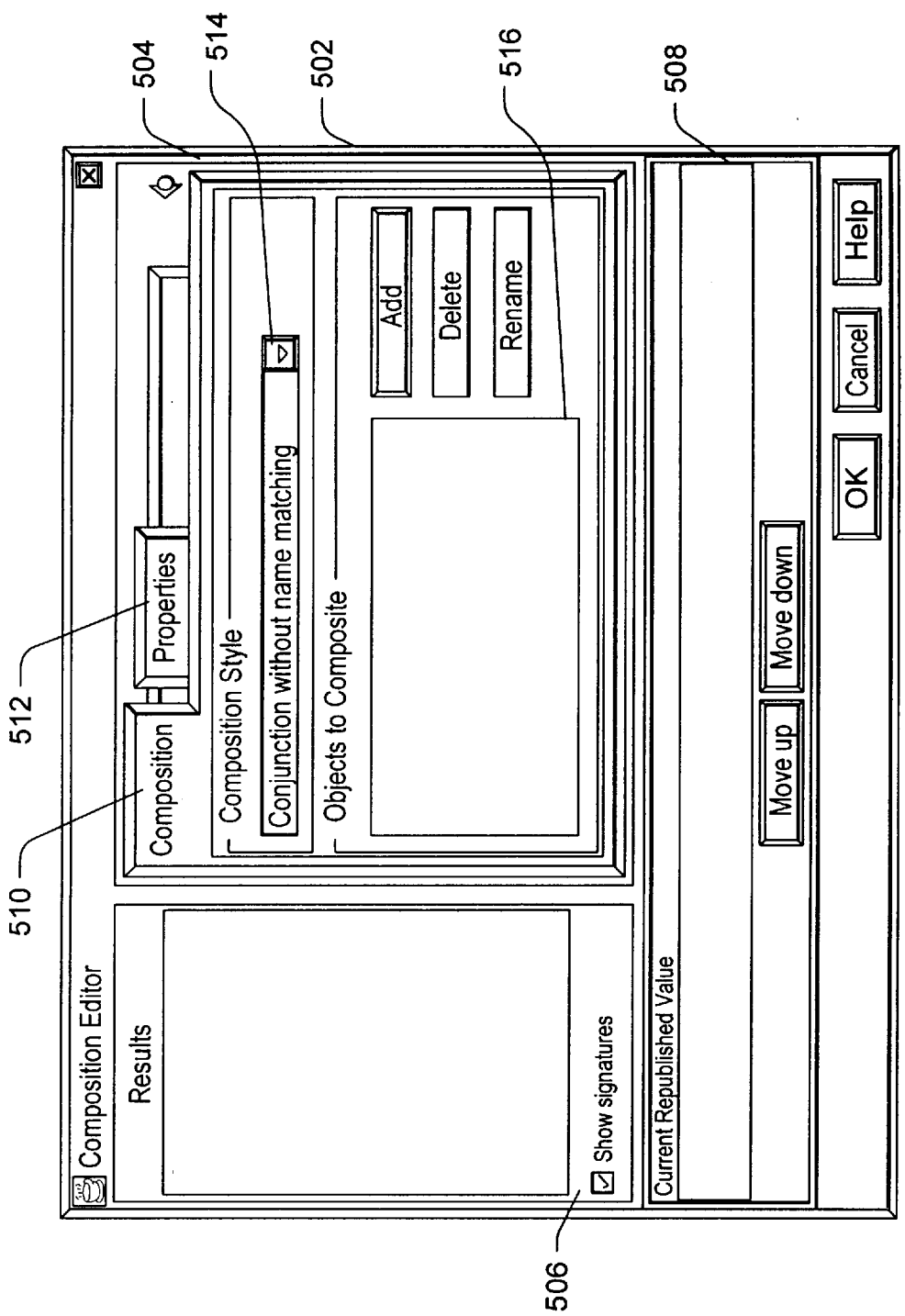
FIG. 5 is a diagram showing one embodiment of a composition editor user interface.

FIG. 5 is a diagram showing one embodiment of a composition editor 132 user interface, which is presented to the user when the composition editor 132 selected. The interface comprises a composition editor window 502 with a first window portion 504, a second window portion 506, a third window portion comprising a composition style drop-down list 514, and a fourth window portion 508.

The first window portion 504 comprises a composition tab 510 and a properties tab 512. When the composition tab 510 is selected, composition style drop-down list 514 is presented in the third window portion, and an object composition box 516 is presented.

The composition style drop-down list 514 allows the user to select from a list of composition rules to be applied to the objects to be combined. FIG. 5 shows a default composition rule in which the methods and attributes from the objects will be conjoined without name matching. This means that the composite object will comprise all of the methods of the selected existing objects, and all of the attributes of the selected existing objects. "Name matching" indicates that the application of the composition rule will create a composite object comprising all of the methods and attributes of the existing objects, subject to the additional requirement that the method and attribute names are the same in both existing components. Conjunction without name matching indicates that application of the composition rule will result in all of the methods and attributes of the contributing objects. A disjunctive composition rule is also available, with or without word matching. A disjunctive composition rule indicates that the combined object should include the attributes and methods of all objects, but only one of the objects exists at runtime. Other composition rules with disjunctive characteristics can also be elected. For example, a rule may be selected that excludes the attributes and methods that are present in both of the existing objects to be combined.

The object composition box 516 shows which objects are available for combining. The second window portion 506 shows the results of the composition of the existing objects, and the fourth window portion 508 allows modification of the attributes and methods displayed in the second window portion 506, and allows new attributes and methods to be added to the composite object. Because no existing objects have been selected to be operated on by the composition editor 132, the object composition box 516 is empty. Both the object composition box 516 and the second window portion 506 are illustrated and further described in FIG. 7.

Figure 6:
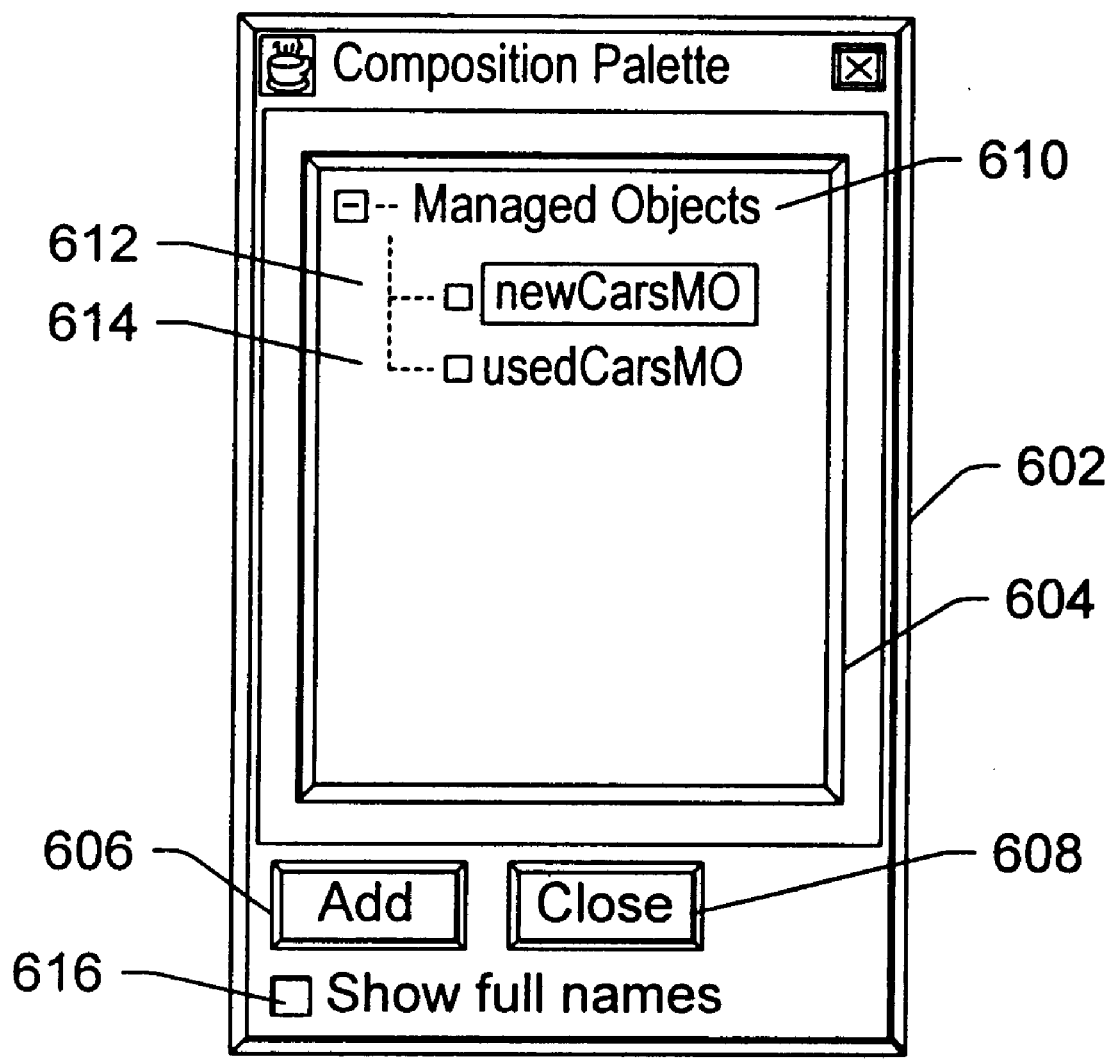
FIG. 6 is a diagram showing one embodiment of a composition palette interface used to specify objects to be combined by the composition editor.

FIG. 6 is a diagram showing one embodiment of a composition palette interface used to specify objects to be combined with the composition editor 132. The interface comprises a composition palette window 602 including a composition object selection box 604, add button 606, and a close button 608. The composition object selection box 604 displays a directory of managed objects 610, including a first managed object 612 called "newCarsMO" and a second managed object 614 called "usedCarsMO." The user can select which managed objects are to be combined by selecting managed objects in the composition object selection box 604, and selecting the add button 606. When completed, the user selects the close button 608. A name checkbox 616 is provided to show full managed object names in the composition object selection box 604.

Figure 7:
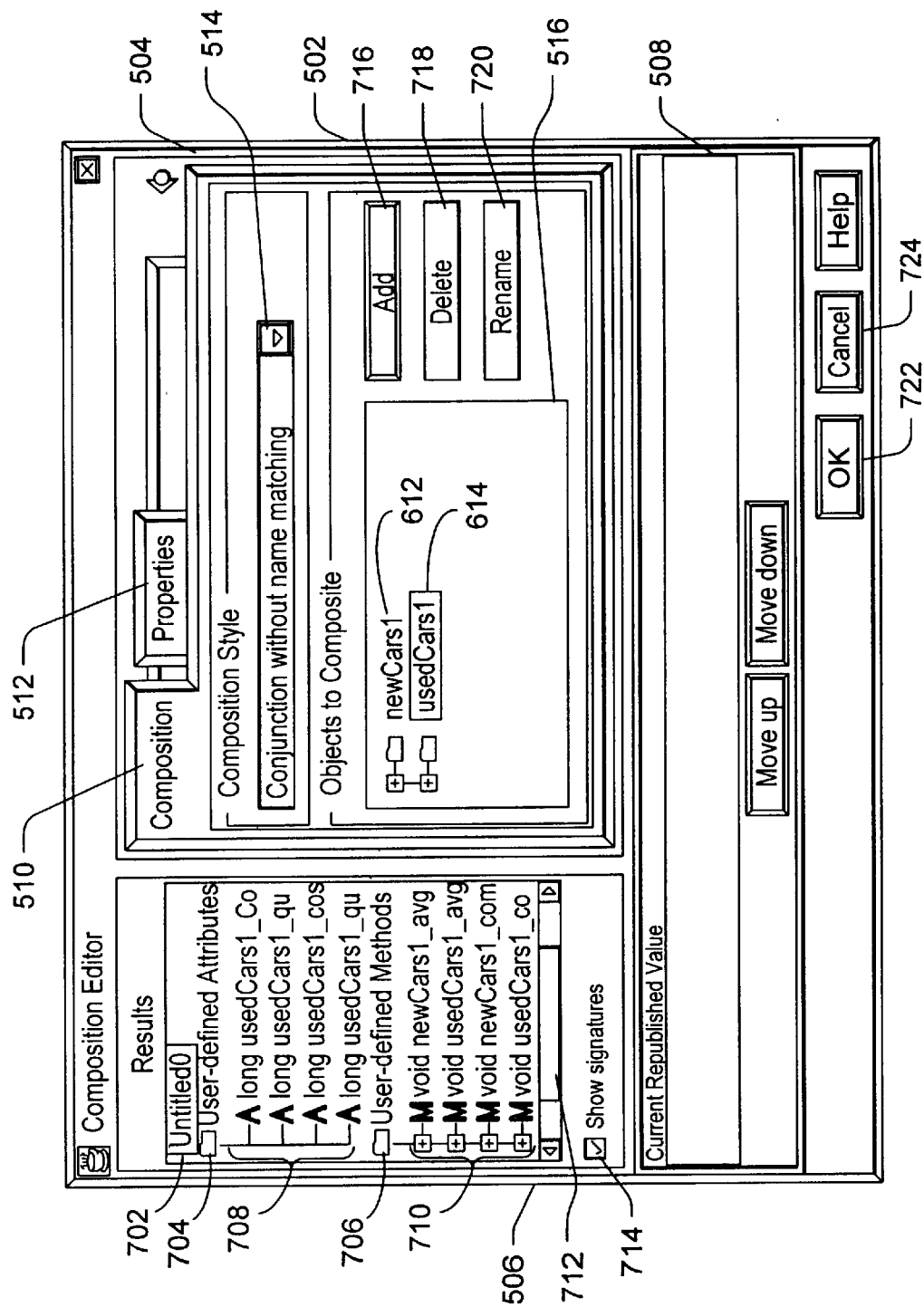
FIG. 7 is a diagram showing the composition editor user interface after the managed objects have been selected.

FIG. 7 is a diagram showing the composition editor window 502 after the first managed object 612 and the second managed object 614 have been selected to be used to generate a composite object. The object composition box 516 now shows the first managed object 612, and the second managed object 614. The selected managed objects in the object composition box 516 are combined according to the composition rule selected via the composition style drop-down list 514, and the methods and attributes from the resulting combination are displayed in the second window portion 506. The second window portion 506 displays the name of the composite object. When a new composite object is created, the default name is "Untitled" appended by an incremented number. Below the composite object name is a first folder 704 having the attributes 708 and methods 710 that resulted from application of the combination rule. Scroll bar 712 allows the entire length of the attributes and method names to be viewed. Signature check box 714 causes the method signatures (parameter names and types) to be shown.

Objects listed in the object composition box 516 are combined according to the composition rule in the composition style drop-down list 514 when add button 606 (depicted in FIG. 6) is depressed. The add button 716 causes the composition palette window 602 to be shown. Objects listed in the object composition box 516 can be deleted or renamed with delete button 718 and rename button 720, respectively.

Figure 8:
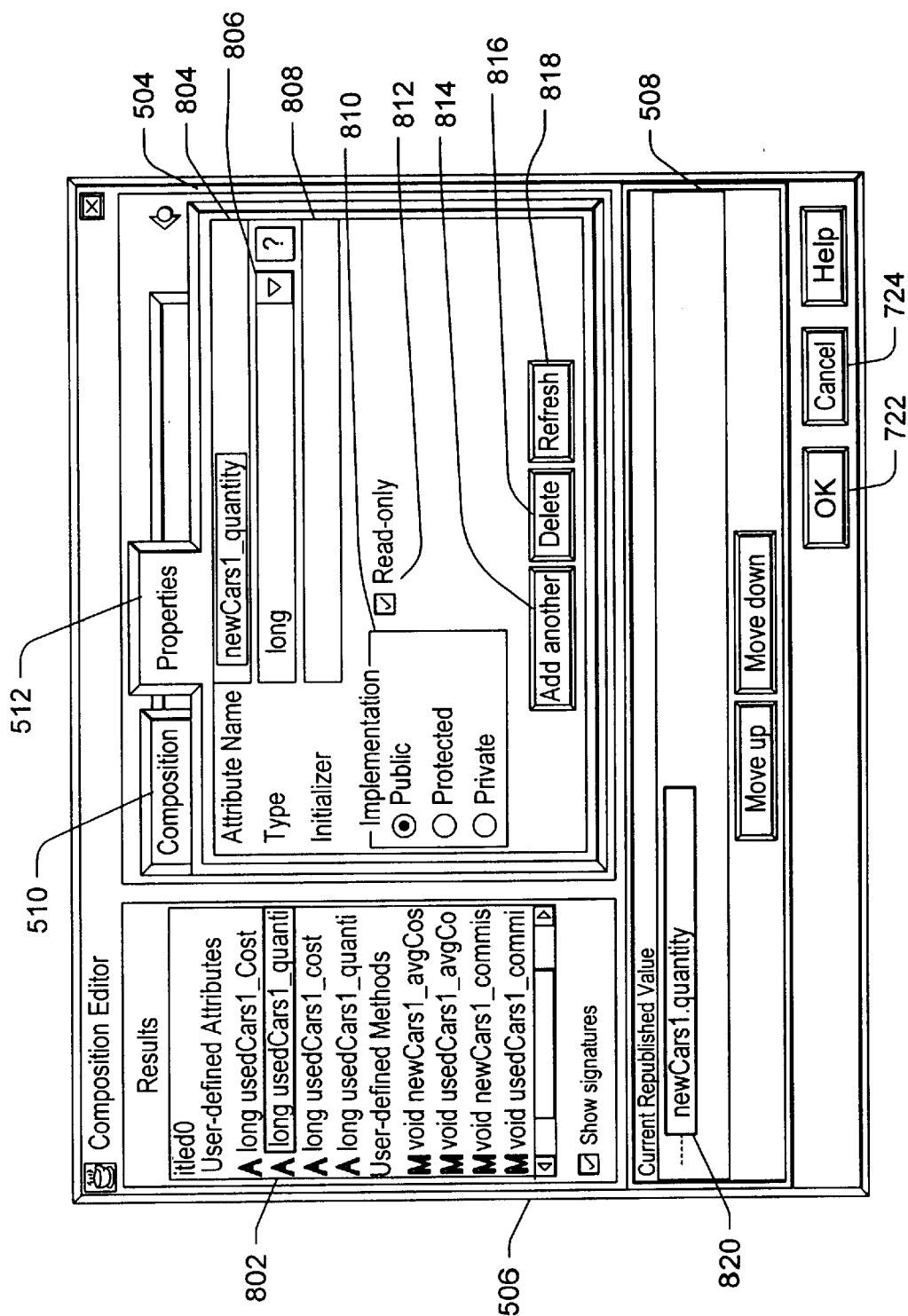
FIG. 8 is a diagram showing a second embodiment of the composition editor user interface.

FIG. 8 is a diagram showing another embodiment of the composition editor user interface. In the illustrated embodiment, one of the combined attributes 708, namely the "newCars 1_quantity" attribute 802 is selected in the second window portion 506. When the properties tab 512 is selected, the first window portion 504 displays the properties of the selected combined attribute 802. The attribute name is displayed in attribute name box 804, and can be changed if desired. The attribute type is presented in an attribute drop-down list 806. For data types having an initializer (i.e. String), the initializer for the attribute 802 is displayed in the initializer box 808. Initializers are the value of an attribute when it is created.

The composition editor user interface first window portion 504 also shows a selectable radio button area 810 which indicates whether the attribute is public, protected, or private. The selectable radio button area 810 is also grayed where the selection cannot be changed. A read only selection box 812 is also provided. Similarly, if one of the combined methods 710 were selected instead of an attribute, the properties of that method would be viewable and changeable through the properties tab 512.

The first window portion 504 also comprises an add another button 814 which permits another attribute or method to be added to the composite object, a delete button 816 that allows the attribute or method to be deleted, and a refresh button 818 to display the most up to date version of the information in the first window portion.

The embodiment shown in FIG. 8 also comprises a fourth window portion 508 which shows the republished value of the attribute selected in the second window portion 506, allowing further editing of the attribute or method as is desired. This window is used when the user modifies an attribute or method, when the user creates a new attribute or method from existing attributes or method (by defining functional relationships among the attributes and methods, by renaming them, or by grouping them in a convenient way), and is further described with respect to FIGS. 9, 10, and 11.

Figure 9:
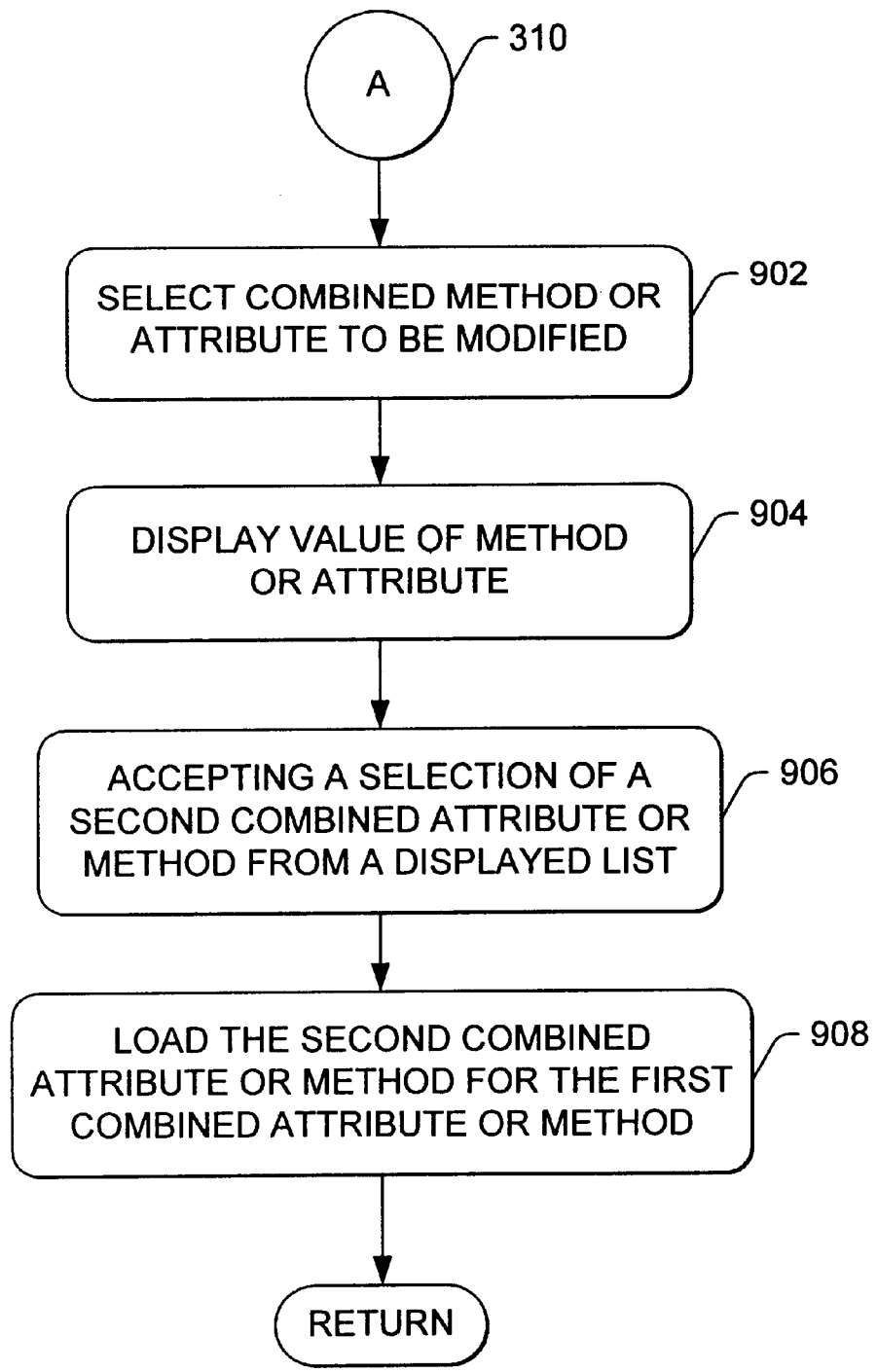
FIG. 9 is a flow chart illustrating the operations performed in modifying the attributes and methods of the combined object.

FIG. 9 is a flow chart illustrating the operations performed in modifying combined attributes or methods. First, the combined attribute 708 or method 710 to be modified is selected 902. Then, the value of the selected attribute 708 or method 710 is displayed 904 in the fourth window portion 508.

The user can then select a second combined attribute or method from a list of available combined attributes or methods to assign to the selected method from a displayed list. The computer 102 accepts 906 that selection, and loads the second selected combined attribute or method for the first combined attribute or method, as shown in block 908.

Figure 10:
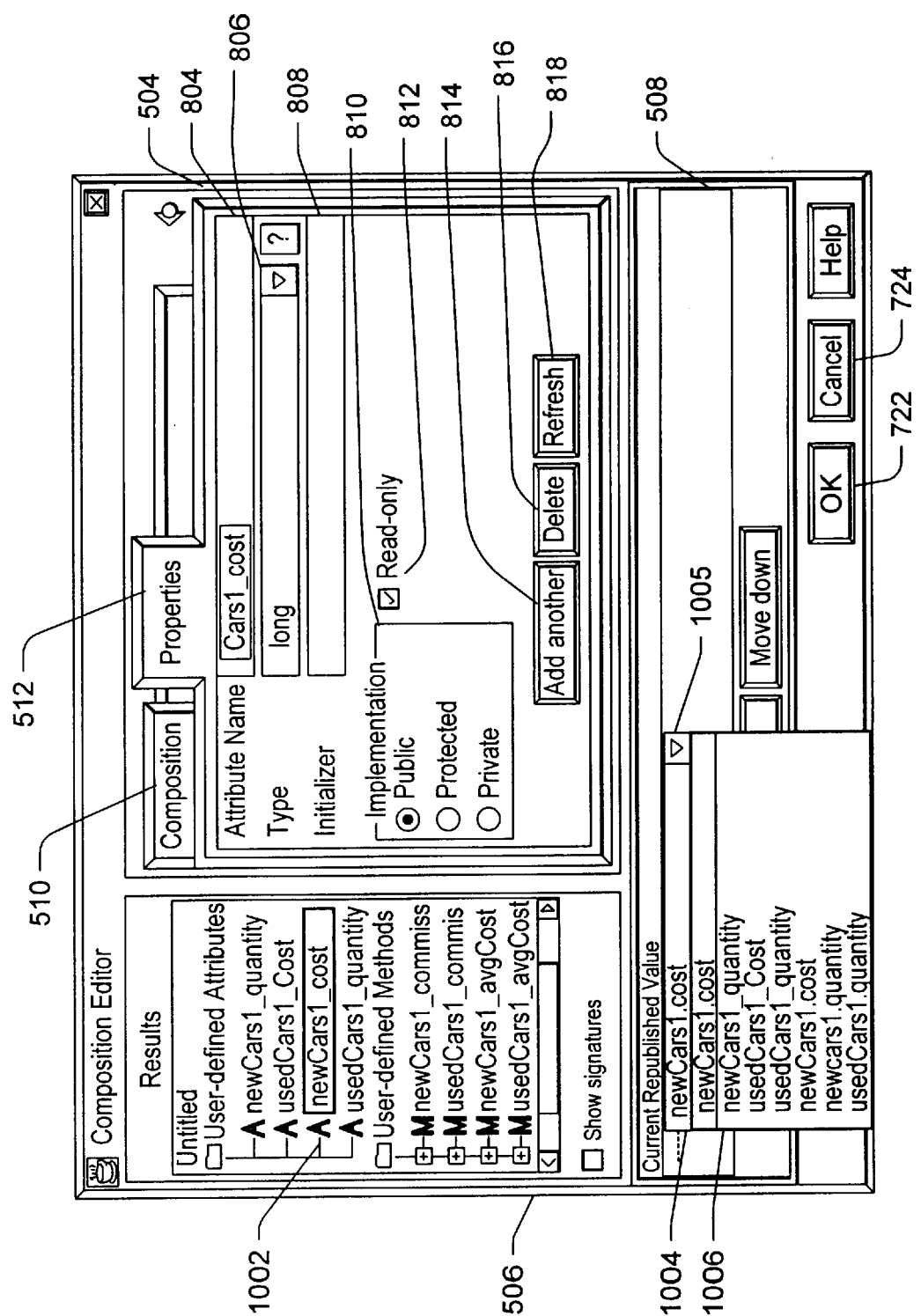
FIG. 10 is a diagram showing another embodiment of the composition interface in which attributes and methods are modified.

FIG. 10 is a diagram showing another embodiment of the composition editor 132 user interface. This embodiment provides a user interface for the operations described with respect to FIG. 9. After the user selects an attribute or method to be modified (attribute "newCars 1_cost" 1002 in FIG. 10, for example), a drop-down list 1004 appears in the fourth window portion 508. The nominal input from this box is the current name of the attribute, as that selection will result in no changes to the attribute. When the user selects the drop down button 1005, a list of available attributes is presented for selection by the user. This list can be appropriately filtered by attribute type or other suitable parameter, to assure that the selected modification is a valid modification. By way of example, in the embodiment illustrated in FIG. 10, the attribute newCars 1_cost can be made to take on characteristics of any of the attributes in drop-down list 1006.

Figure 11:
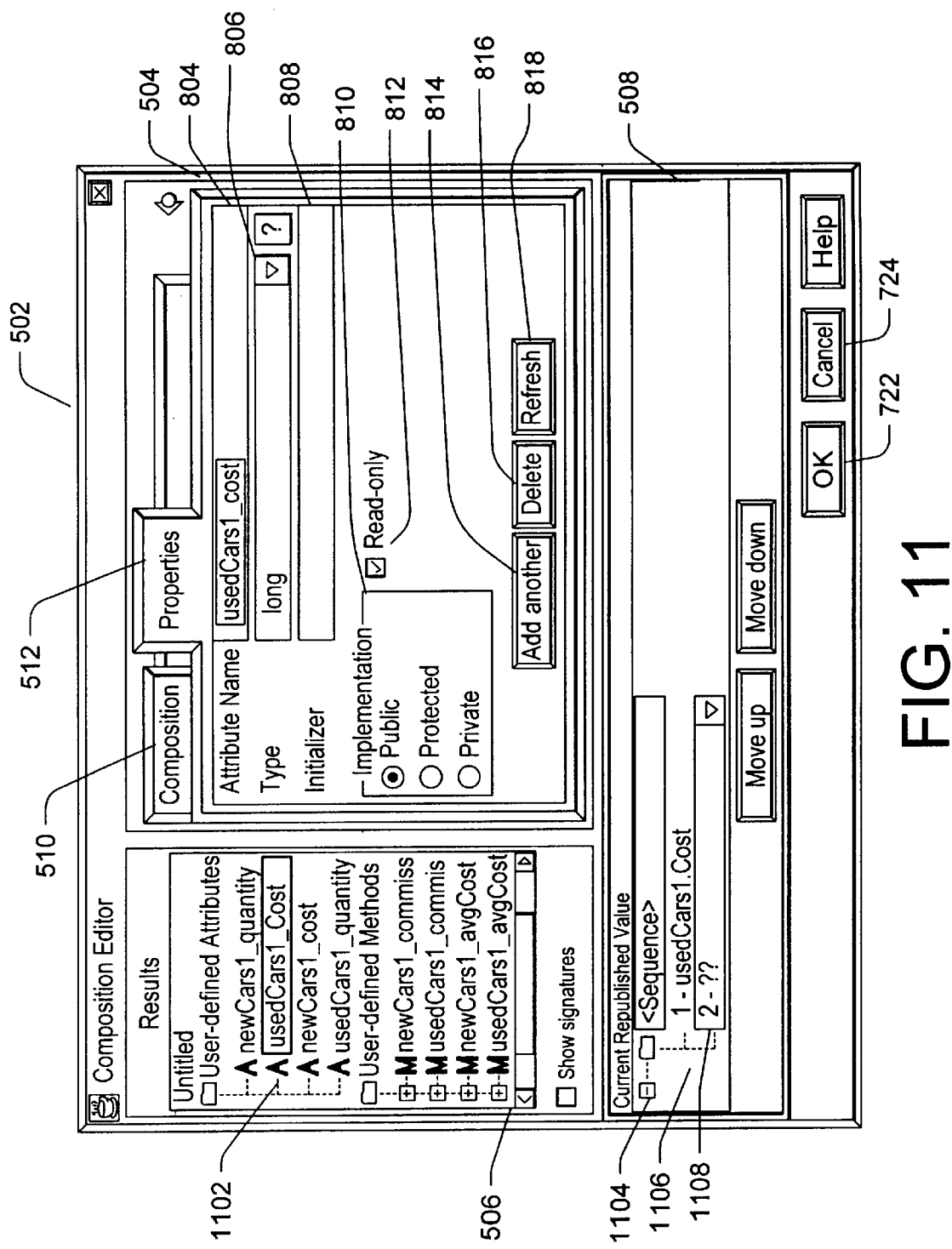
FIG. 11 is a diagram showing the modification of an attribute to include conjunctive and disjunctive sequences.

FIG. 11 shows another embodiment of the composition editor 132 user interface. In this embodiment, the selection of an attribute 1102 allows the user to assign an attribute to a conjunctive sequence of attributes or methods so that each of the attributes or methods in the sequence will be called when the selected combined attribute 1102 is called. Alternatively, a disjunctive sequence of attributes can be defined. In a disjunctive sequence, the differences between the selected objects can be used to specify which of the attributes are called when the selected attribute 1102 is called. For example, the sequence list may include three attributes, only one of which has a non-null value. If the user desires that the selected attribute 1102 take on the non-null value, the disjunctive sequence can be used to define this relationship.

Conclusion

This concludes the description of the preferred embodiments of the present invention. In summary, the present invention describes a method, apparatus, and article of manufacture for combining existing objects.

The method comprises the steps of accepting a selection of existing objects to combine, retrieving the methods and attributes of the selected objects, applying a composition rule to the retrieved methods and attributes to define combined methods and attributes, and storing references to the combined methods and attributes to the composite object. The present invention also comprises an article of manufacture, tangibly embodying a series of instructions for performing the above steps.

The apparatus comprises a processor for selecting existing objects and for applying a composition rule to the retrieved objects and methods and an I/O device for retrieving the methods an attributes for the selected objects and for storing references to the combined methods and attributes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of combining existing objects, each comprising at least one method and at least one attribute to form a composite object according to a composition rule, comprising the steps of:

accepting a selection of existing objects to combine;
   retrieving the methods and attributes of the selected objects;
   applying the composition rule to the retrieved methods and attributes to define combined methods and attributes;
   storing references to the combined methods and attributes to the composite object; and
   defining a managed object from the composite object.

2. The method of claim 1, wherein the composition rule is selectable from the group comprising:

a conjunction of methods and attributes; and
   a disjunction of methods and attributes.

3. The method of claim 2, further comprising the step of assigning new names for conflicting attribute names and method names.

4. The method of claim 1, wherein the step of accepting a selection of objects to combine comprises the steps of:

invoking a composition editor, the composition editor presenting a window comprising a first window portion presenting the existing objects; and
   accepting a selection of objects to combine from the first window portion.

5. The method of claim 4, wherein the composition editor further comprises a second window portion presenting the combined methods and attributes.

6. The method of claim 4, wherein the composition editor further comprises a third window portion presenting the composition rules.

7. The method of claim 4, wherein the composition editor further comprises a fourth window portion presenting the value of attributes selected in the second window portion, and the method further comprising the steps of:

accepting a selection of an attribute in the second window portion; and
   displaying the value of the attribute in the fourth window portion.

8. The method of claim 7, further comprising the steps of:
   accepting a selection of a first combined attribute;
   accepting a selection of a second combined attribute; and
   loading the second combined attribute for the first combined attribute.

9. An apparatus for combining existing objects, each comprising at least one method and at least one attribute to form a composite object according to a composition rule, comprising:

means for accepting a selection of existing objects to combine;

means for retrieving the methods and attributes of the selected objects;

means for applying the composition rule to the retrieved methods and attributes to define combined methods and attributes;

means for storing references to the combined methods and attributes to the composite object; and means for defining a managed object from the composite object.

10. The apparatus of claim 9, wherein the composition rule is selectable from the group comprising:

a conjunction of methods and attributes; and a disjunction of methods and attributes.

11. The apparatus of claim 10, further comprising means for assigning new names for conflicting attribute names and method names.

12. The apparatus of claim 9, wherein the means for accepting a selection of objects to combine comprises:

means for invoking a composition editor, the composition editor presenting a window comprising a first window portion presenting the existing objects; and means for accepting a selection of objects to combine from the first window portion.

13. The apparatus of claim 12, wherein the composition editor further comprises a second window portion presenting the combined methods and attributes.

14. The apparatus of claim 12, wherein the composition editor further comprises a third window portion presenting the composition rules.

15. The apparatus of claim 12, wherein the composition editor further comprises a fourth window portion presenting the value of attributes selected in the second window portion, and the apparatus further comprises:

means for accepting a selection of an attribute in the second window portion; and means for displaying the value of the attribute in the fourth window portion.

16. The apparatus of claim 15, further comprising:

means for accepting a selection of a first combined attribute displayed in the second window portion;

means for accepting a selection of a second combined attribute from a displayed list of all combined attributes; and means for loading the second combined attribute for the first combined attribute.

17. An article of manufacture, embodying logic to perform method steps of combining existing objects, each comprising at least one method and at least one attribute to form a composite object according to a composition rule, the method steps comprising the steps of:

accepting a selection of existing objects to combine;

retrieving the methods and attributes of the selected objects;

applying the composition rule to the retrieved methods and attributes to define combined methods and attributes;

storing references to the combined methods and attributes to the composite object; and defining a managed object from the composite object.

18. The article of manufacture of claim 17, wherein the composition rule is selectable from the group comprising:

a conjunction of methods and attributes; and a disjunction of methods and attributes.

19. The article of manufacture of claim 18, wherein the method steps further comprise the method step of assigning new names for conflicting attribute names and method names.

20. The article of manufacture of claim 17, wherein the method step of accepting a selection of objects to combine comprises the method steps of:

invoking a composition editor, the composition editor presenting a window comprising a first window portion presenting the existing objects; and accepting a selection of objects to combine from the first window portion.

21. The article of manufacture of claim 20, wherein the composition editor further comprises a second window portion presenting the combined methods and attributes.

22. The article of manufacture of claim 21, wherein the composition editor further comprises a third window portion presenting the composition rules.

23. The article of manufacture of claim 21, wherein the composition editor further comprises a fourth window portion presenting the value of attributes selected in the second window portion, and the method steps further comprise the steps of:

accepting a selection of an attribute in the second window portion; and displaying the value of the attribute in the fourth window portion.

24. The article of manufacture of claim 23, wherein the method steps further comprise the method steps of:

accepting a selection of a first combined attribute;

accepting a selection of a second combined attribute; and loading the second combined attribute for the first combined attribute.

25. A method of combining existing objects, each comprising at least one method and at least one attribute to form a composite object according to a composition rule, comprising the steps of:

accepting a selection of existing objects to combine;

retrieving the methods and attributes of the selected objects;

applying the composition rule to the retrieved methods and attributes to define combined methods and attributes; and storing references to the combined methods and attributes to the composite object;

wherein the step of accepting a selection of objects to combine comprises the steps of invoking a composition editor, the composition editor presenting a window comprising a first window portion presenting the existing objects; and accepting a selection of objects to combine from the first window portion.

26. The method of claim 25, wherein the composition editor further comprises a second window portion presenting the combined methods and attributes.

27. The method of claim 25, wherein the composition editor further comprises a third window portion presenting the composition rules.

28. The method of claim 25, wherein the composition editor further comprises a fourth window portion presenting the value of attributes selected in the second window portion, and the method further comprising the steps of:

accepting a selection of an attribute in the second window portion; and displaying the value of the attribute in the fourth window portion.

29. The method of claim 28, further comprising the steps of:

accepting a selection of a first combined attribute;

accepting a selection of a second combined attribute; and loading the second combined attribute for the first combined attribute.

30. An apparatus for combining existing objects, each comprising at least one method and at least one attribute to form a composite object according to a composition rule, comprising:

means for accepting a selection of existing objects to combine;

means for retrieving the methods and attributes of the selected objects;

means for applying the composition rule to the retrieved methods and attributes to define combined methods and attributes;

means for storing references to the combined methods and attributes to the composite object;

wherein the means for accepting a selection of objects to combine comprises means for invoking a composition editor, the composition editor presenting a window comprising a first window portion presenting the existing objects; and means for accepting a selection of objects to combine from the first window portion.

31. The apparatus of claim 30, wherein the composition editor further comprises a second window portion presenting the combined methods and attributes.

32. The apparatus of claim 30, wherein the composition editor further comprises a third window portion presenting the composition rules.

33. The apparatus of claim 30, wherein the composition editor further comprises a fourth window portion presenting the value of attributes selected in the second window portion, and the apparatus further comprises:

means for accepting a selection of an attribute in the second window portion; and means for displaying the value of the attribute in the fourth window portion.

34. The apparatus of claim 33, further comprising:

means for accepting a selection of a first combined attribute displayed in the second window portion;

means for accepting a selection of a second combined attribute from a displayed list of all combined attributes; and means for loading the second combined attribute for the first combined attribute.

35. An article of manufacture, embodying logic to perform method steps of combining existing objects, each comprising at least one method and at least one attribute to form a composite object according to a composition rule, the method steps comprising the steps of:

accepting a selection of existing objects to combine;

retrieving the methods and attributes of the selected objects;

applying the composition rule to the retrieved methods and attributes to define combined methods and attributes;

storing references to the combined methods and attributes to the composite object;

wherein the method step of accepting a selection of objects to combine comprises the method steps of invoking a composition editor, the composition editor presenting a window comprising a first window portion presenting the existing objects; and accepting a selection of objects to combine from the first window portion.

36. The article of manufacture of claim 35, wherein the composition editor further comprises a second window portion presenting the combined methods and attributes.

37. The article of manufacture of claim 36, wherein the composition editor further comprises a third window portion presenting the composition rules.

38. The article of manufacture of claim 36, wherein the composition editor further comprises a fourth window portion presenting the value of attributes selected in the second window portion, and the method steps further comprise the steps of:

accepting a selection of an attribute in the second window portion; and displaying the value of the attribute in the fourth window portion.

39. The article of manufacture of claim 38, wherein the method steps further comprise the method steps of:

accepting a selection of a first combined attribute;

accepting a selection of a second combined attribute; and loading the second combined attribute for the first combined attribute.

* * * * *